United States Patent [19]
Boie

[11] Patent Number: 5,878,131
[45] Date of Patent: Mar. 2, 1999

[54] INTERFERENCE ATTENUATION FOR ACOUSTIC-DIALERS

[75] Inventor: Robert Albert Boie, Westfield, N.J.

[73] Assignee: AT&T Corp, Middletown, N.J.

[21] Appl. No.: 751,882

[22] Filed: Nov. 18, 1996

[51] Int. Cl.$^6$ .................................................. H04M 1/58
[52] U.S. Cl. .......................... 379/361; 379/339; 379/418
[58] Field of Search .................................. 379/386, 418, 379/283, 355, 339, 93.01, 93.18, 361, 377

[56] References Cited

U.S. PATENT DOCUMENTS

| | | | |
|---|---|---|---|
| 4,947,361 | 8/1990 | Smith et al. | 455/306 |
| 5,214,693 | 5/1993 | Chujo | 379/386 |
| 5,363,443 | 11/1994 | Petty | 379/418 |
| 5,495,526 | 2/1996 | Casaro et al. | 379/386 |
| 5,530,743 | 6/1996 | Sakurai | 379/418 |
| 5,583,933 | 12/1996 | Mark | 379/418 |
| 5,590,182 | 12/1996 | Stevens et al. | 379/377 |

*Primary Examiner*—Scott Wolinsky

[57] ABSTRACT

Acoustic dialers are widely used to dial telephone numbers by generating a pair of DTMF tones for each key being depressed. Non-linearities in telephone systems, acoustic dialer loudspeakers, and telephone microphones may cause interfering tones to be produced due to mixing of generated DTMF tones. These interfering tones are especially problematic when they are near the frequencies of the DTMF tones and have similar amplitudes. When these interfering tones are received by a receiver decoder, the decoder may be unable to distinguish the interfering tones from the DTMF tones, and consequently the decoder may reject the DTMF tones received. The present invention prevents these types of rejections by generating a supplemental tone in addition to the normal DTMF tones. This supplemental tone attenuates the interfering tones so that receiver decoders can distinguish the interfering tones from the DTMF tones.

8 Claims, 4 Drawing Sheets

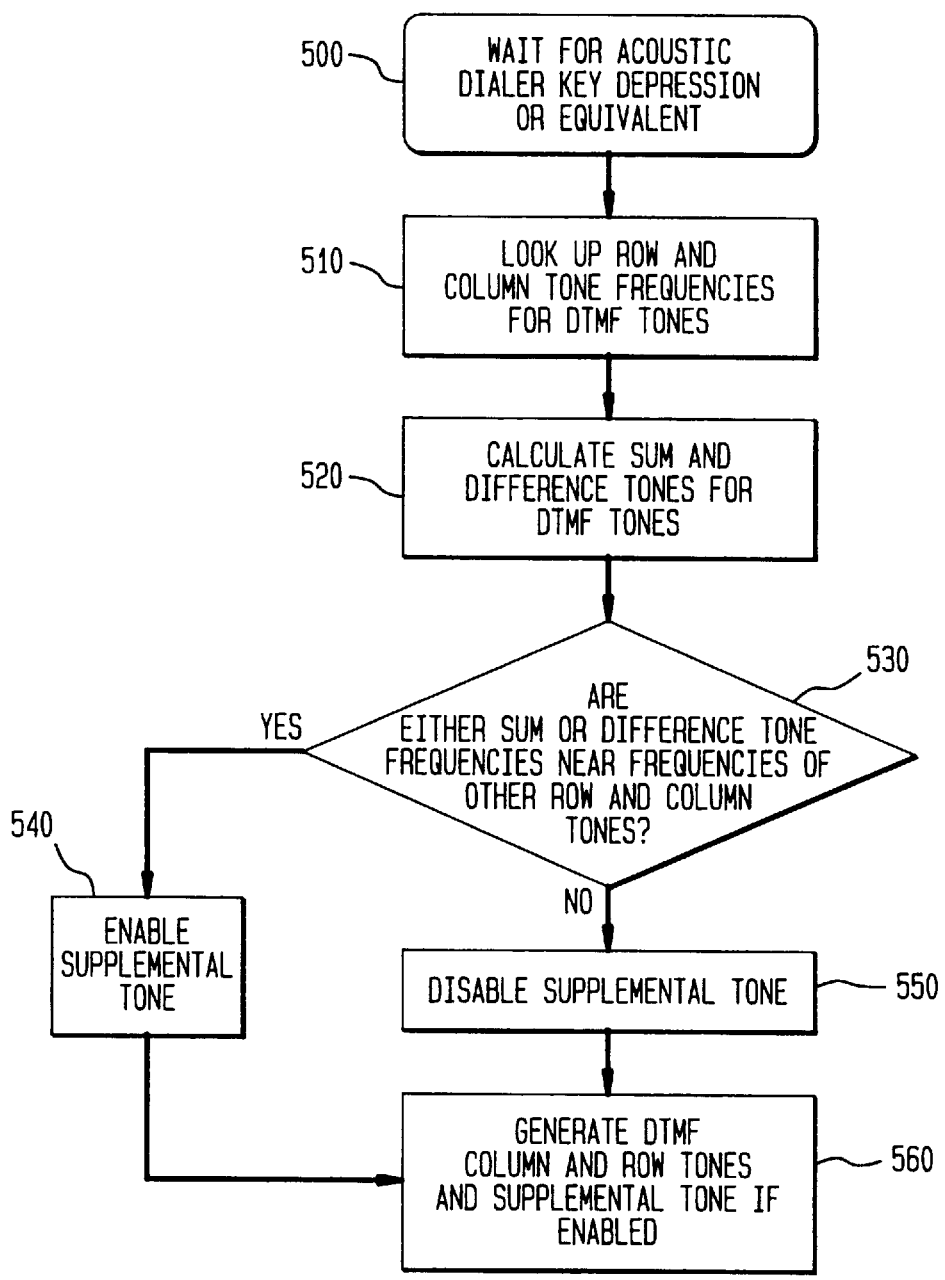

INTERFERENCE ATTENUATION FOR ACOUSTIC-DIALERS

BACKGROUND OF THE INVENTION

This invention relates to acoustic dialers. Acoustic dialers are widely used for touch-tone dialing of telephone numbers by generating a pair of Dual Tone Multi-Frequency (DTMF) tones, and may be used in devices such as pagers, organizers, laptop computers, and phone cards. More particularly, this invention relates to acoustic dialers which dial telephone numbers by playing DTMF tones through a loudspeaker positioned in close proximity to a telephone microphone, whereby the microphone receives the tones played and relays the tones to a DTMF receiver which perceives the tones as if they resulted from keys being depressed on a telephone keypad.

In the prior art, acoustic dialers generate a unique pair of DTMF tones to simulate a particular key on a telephone keypad being depressed. These tones are generated in response to an individual key being manually depressed on the acoustic dialer or in response to automated dialing of a telephone number in the acoustic dialer's memory. The frequencies of these tones are determined by the particular choice of telephone key being represented and are selected based upon the key's position within the typical telephone keypad. The typical telephone keypad is arranged with three columns and four rows of keys: the first three rows representing the numbers 1 through 9, and the last row representing the star symbol(*), number 0, and pound symbol (#). Each column is assigned a column frequency which is typically 1209 Hertz (Hz) for the left column, 1336 Hz for the center column, and 1477 Hz for the right column. Similarly, each row is assigned a row frequency which is typically 697 Hz for the top row, 770 Hz for the upper-middle row, 852 Hz for the lower-middle row, and 941 Hz for the bottom row. Accordingly, selecting the top-left or 1 key will cause tones with frequencies of 1209 Hz and 697 Hz to be produced. Likewise, selecting the lower-right or pound key will cause tones with frequencies of 1477 Hz and 941 Hz to be generated.

The tones generated by acoustic dialers are decoded to indicate to the receiving apparatus the key being selected at the acoustic dialer. Typically, two banks of filters are utilized to determine the two frequencies being generated—and, accordingly, the key being depressed. One bank is used to represent the keypad's columns, and the other bank is used to represent the keypad's rows. The center frequencies of the column and row filters match those of the column and row tones generated by the acoustic dialer. Thus, when the 1 key of the acoustic dialer is selected, a pair of tones is generated and the receiver filters with center frequencies of 1209 Hz (from the column bank) and 697 Hz (from the row bank) have subtantial output.

For tone pairs to be properly decoded, the decoding logic requires substantial output from one filter in each bank and minimal output from all other filters. Tone pairs are rejected if more than one filter of each bank has a substantial output. In this way, talking, singing, and other background noises are prevented from being recognized as tone pairs produced by dialing. This rejection mechanism, however, may also reject valid tone pairs when non-linear characteristics which provide interfering tones are present in the signal path between the acoustic dialer and tone pair decoder. Typically, non-linear characteristics are introduced into a signal path by acoustic dialer loudspeakers and telephone microphones (especially older carbon microphones), but may also be attributed to other system non-linearities.

Interfering tones are typically sum or difference tones which produce a substantial signal strength at the filter outputs corresponding to column and row tones not being generated and are produced by the mixing of DTMF tones. The frequency of a sum tone can be determined by adding the values of the two frequencies being mixed and the frequency of a difference tone can be determined by subtracting the value of the lower of the frequencies from the value of the higher of the frequencies being mixed. An interfering tone is most problematic when its frequency is near the center frequency of one of the column or row filters, and its filtered signal strength approaches or exceeds the filtered signal strength of the strongest filter output in the same filter bank. With these traits, an interfering tone appears sufficiently similar to a DTMF tone that the receiver senses too many tones and thus rejects the valid tone pair.

For example, the 3 key generates a DTMF tone pair with frequencies of 1477 Hz and 697 Hz. For these tones, the sum frequency is 2174 Hz and the difference frequency is 780 Hz. The sum frequency is far away from the center frequencies of the receiver filters, and thus does not interfere. The difference frequency of 780 Hz, however, is only 10 Hz away from the upper-middle-row-filter center frequency of 770 Hz. In this situation, three filter outputs may have substantial signal strength: the 1477 Hz filter (due to the column DTMF tone); the 697 Hz filter (due to the row DTMF tone); and the 770 Hz filter (due to the interfering difference tone). Since both the 697 Hz filter and the 770 Hz filter are in the row filter bank, the decoder will reject the tone pair and thus not detect the dialing of the 3 key. Similarly, the 6 key DTMF tone frequencies can cause decoder rejection by having a difference frequency of 707 Hz which is only 10 Hz away from the top-row-filter center frequency of 697 Hz.

It is therefore an object of this invention to provide an acoustic dialer which is robust to the dialing of all keys of a telephone keypad via both linear and non-linear systems.

SUMMARY OF THE INVENTION

This and other objects of the invention are accomplished in accordance with the principles of the invention by providing an acoustic dialer which generates a supplemental tone to reduce the amplitude of the interfering tones produced by the mixing of the DTMF tones generated for each key depression. This supplemental tone is selected so that whenever non-linearities are present, the supplemental tone will mix with the DTMF tones being generated to produce tones that cancel out the interfering tones. These supplemental tones are also designed to produce no important interfering tone when non-linearities are not present. For example, the supplemental tone may be selected so that it has the form $-A^*\sin(2\pi(2p-q)t)$, where A is an empirically determined amplitude of the supplemental tone, p is the frequency of the column tone having the form $\sin(2\pi pt)$, q is the frequency of the row tone having the form $\sin(2\pi qt)$, and t is time. When this form of supplemental tone mixes with the column tone, of frequency p, the resultant canceling tone substantially reduces the amplitude of the interfering tone due to mixing of the DTMF tones.

Further features of the invention, its nature and various advantages will be more apparent from the accompanying drawings and the following detailed description of the preferred embodiments.

BRIEF DESCRIPTION OF THE DRAWINGS

FIG. 5 is a flow chart illustrating a method for determining whether a supplemental tone need be generated to reduce the amplitude of interfering tones caused by mixing of a particular pair of DTMF tones.

DETAILED DESCRIPTION OF THE PREFERRED EMBODIMENTS

Figure 1:
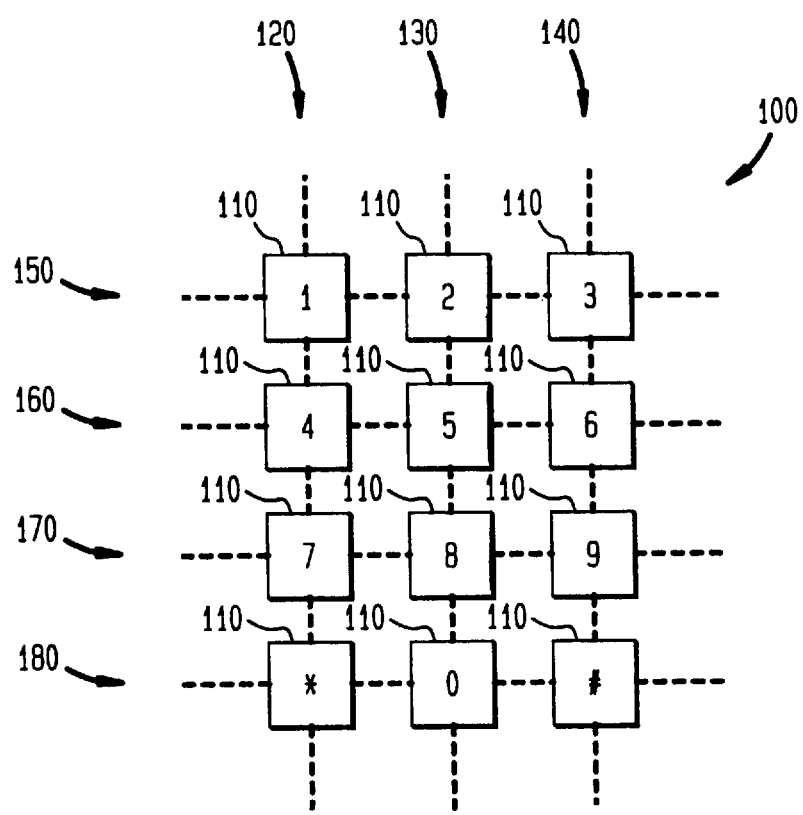
FIG. 1 is a layout drawing for a typical telephone keypad of the prior art illustrating the columns and rows which are used to determine the two DTMF tones generated for each key depression.

Referring to FIG. 1, an example of a typical telephone keypad 100 of the prior art is illustrated. As shown, keypad 100 consists of twelve keys 110 arranged in three columns 120, 130, and 140 and four rows 150, 160, 170, and 180. Rows one 150, two 160, and three 170 comprise the numbers one (1) through nine (9) keys 110, and row four 180 comprises the star symbol (*), number zero (0), and pound symbol (#) keys 110. Each combination of column and row number corresponds to a unique key 110. For example, column one 120, row three 170 corresponds to the number seven key 110, and column three 140, row two 160 corresponds to the number six key 110.

In a typical acoustic dialer of the prior art, a pair of tones is generated to indicate the depression of one of keys 110 of a typical telephone keypad 100. These tones may be generated in response to the depression of a key on an acoustic dialer or in response to automated dialing of a telephone number in the acoustic dialer's memory. One tone is generated for the key's column 120, 130, or 140, and one tone is generated for the key's row 150, 160, 170, or 180. Typically these tones have frequencies of 1209 Hz for column one 120, 1336 Hz for column two 130, 1477 Hz for column three 140, 697 Hz for row one 150, 770 Hz for row two 160, 852 Hz for row three 170, and 941 Hz for row four 180. For example, pressing the three key 110 causes the tones for column three 140 and row one 150 to be generated. Similarly, pressing the star key 110 causes the tones for column one 120 and row four 180 to be generated.

Figure 2:
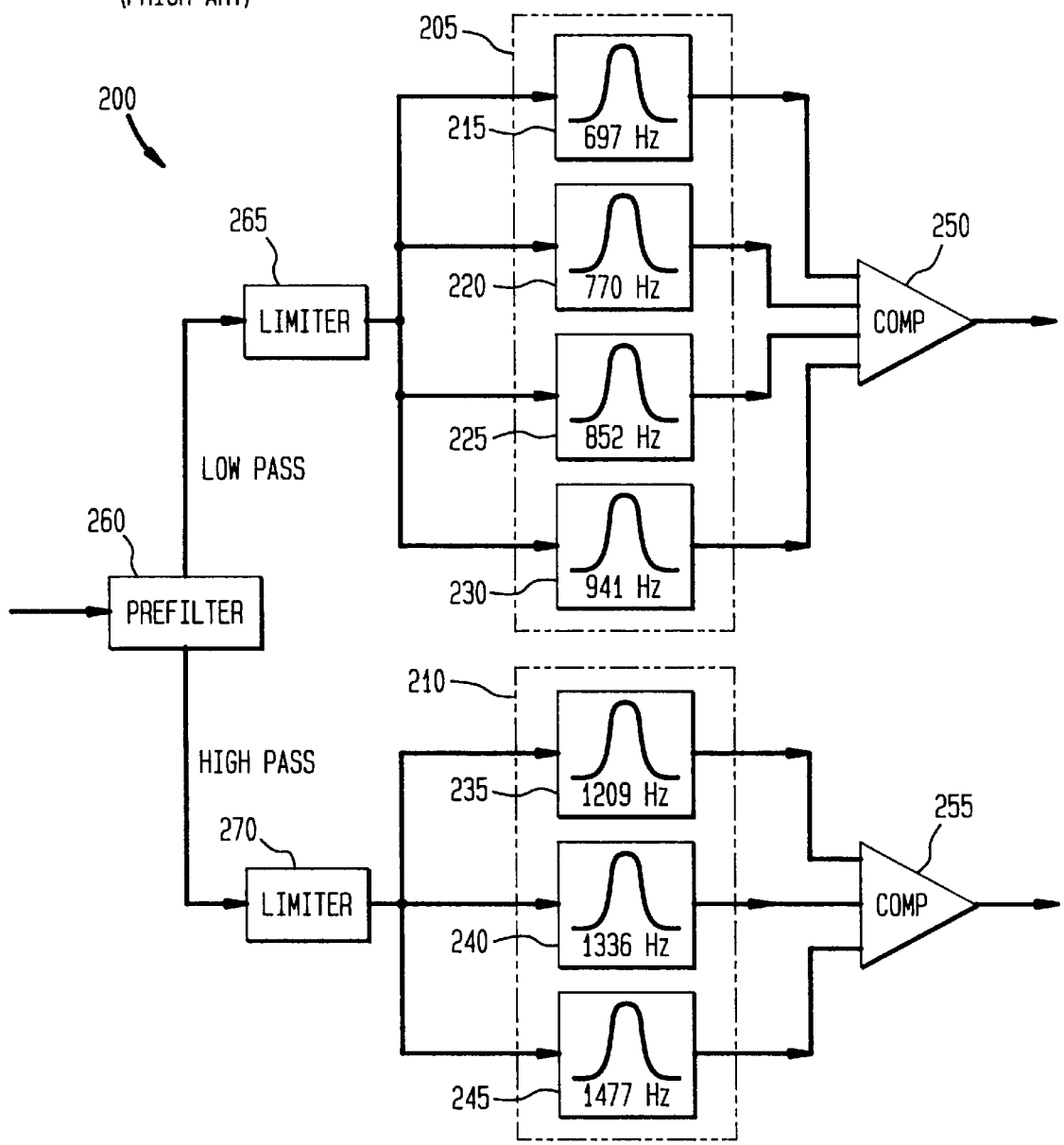
FIG. 2 is a schematic drawing of a typical receiver decoder of the prior art illustrating the filter banks and comparators used to decode DTMF tones.

After these tones pass through a telephone system, the tones are received and decoded by a receiver. FIG. 2 illustrates the decoder portion 200 of a typical receiver. As shown, decoder portion 200 usually comprises a prefilter 260 that separates high and low tones, a pair of limiters 265 and 270, and a pair of filter banks 205 and 210. Column filter bank 210 comprises three filters 235, 240, and 245, with center frequencies of 1209 Hz, 1336 Hz, and 1477 Hz, respectively. Row filter bank 205 comprises four filters 215, 220, 225, and 230, with center frequencies of 697 Hz, 770 Hz, 852 Hz, and 941 Hz, respectively. After the tone signals are filtered by filter banks 205 and 210, comparators 250 and 255 compare the resultant signals from each filter. Comparator 255 indicates which filters 235, 240, and 245 of column filter bank 210 have substantial signal strengths, and comparator 250 indicates which filters 215, 220, 225, and 230 of row filter bank 205 have substantial signal strengths. The comparator output signals are then processed by additional logic which decodes valid cases of comparator outputs into numbers or symbols dialed.

Figure 3:
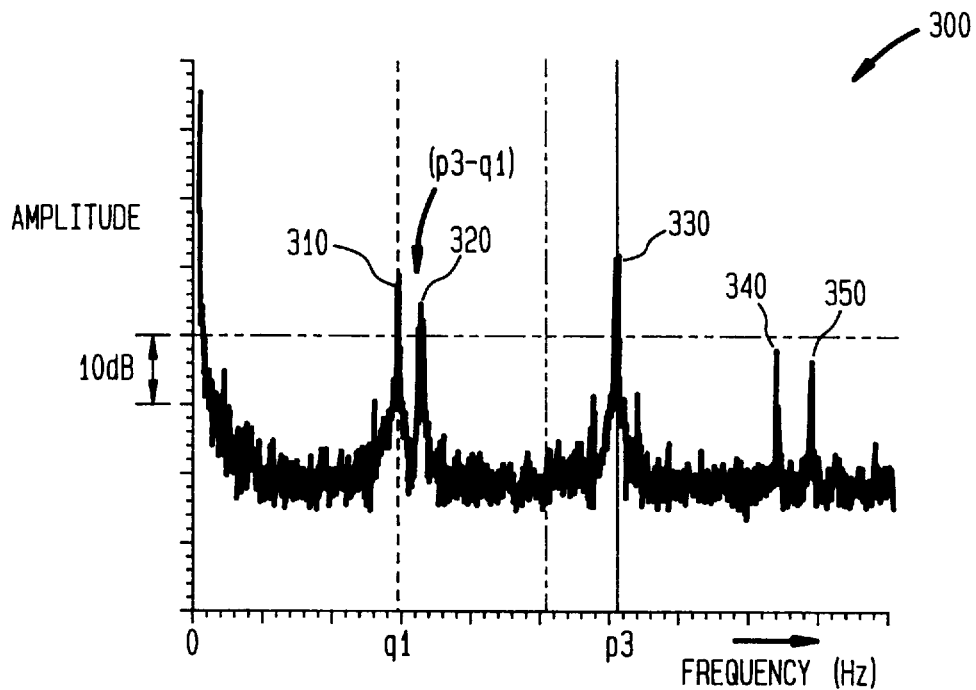
FIG. 3 is an amplitude versus frequency plot showing an example of an interfering tone (with a frequency of p3-q1) caused by mixing of two DTMF tones (with frequencies of p3 and q1) in an acoustic dialer of the prior art. Note that the amplitude of the interfering tone is approximately that of the two DTMF tones.

Numbers or symbols dialed may be rejected, however, as invalid cases of comparator outputs, and hence not be detected, as a result of tone mixing due to system non-linearities. This is especially true when an acoustic dialer is being used which plays DTMF tones through a loudspeaker in close proximity to a carbon telephone microphone. For example, as shown in FIG. 3, interfering tone 320 may result from mixing of DTMF tones 310 and 330. When interfering tone 320 is close in frequency to the center frequencies of filters 215, 220, 225, 230, 235, 240, or 245 (FIG. 2) and has an amplitude close to that of the DTMF tones 310 or 330, the receiver decoding logic rejects all of tones 310, 320, and 330. Unlike interfering tone 320, however, tones 340 and 350 are not likely to interfere with the decoding of the DTMF tones since these signals are too far removed from the center frequencies of any of filters 215, 220, 225, 230, 235, 240, or 245 (FIG. 2).

Figure 4:
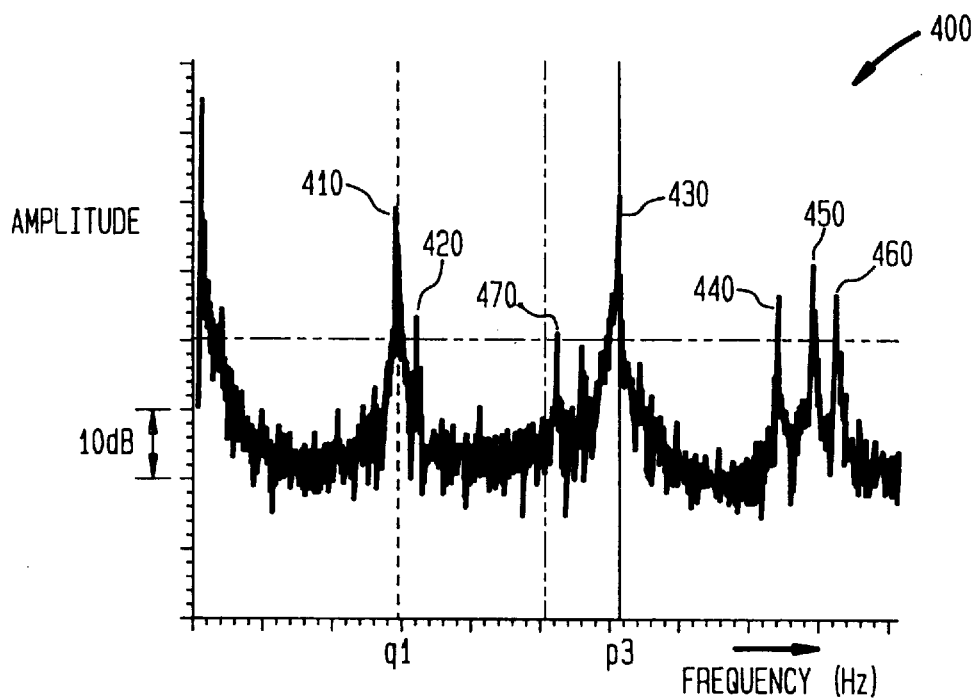
FIG. 4 is an amplitude versus frequency plot showing an example of the reduction in interfering tone amplitude resulting from the addition of a supplemental tone in addition to the two DTMF tones.

By adding a supplemental tone to the pair of DTMF tones generated by the acoustic dialer, interfering tone 320 can be attenuated so that the comparators 250 and 255 (FIG. 2) can properly distinguish interfering tone 320 from DTMF tones 310 and 330. FIG. 4 shows an example of the resultant interfering tone 420 produced by the mixing of a pair of DTMF tones 410 and 430 and a supplemental tone 460. As can be seen, interfering tone 420 is significantly smaller than interfering tone 320 of FIG. 3. This reduction in amplitude enables the decoding logic of the receiver to sufficiently distinguish an interfering tone 420 from a DTMF tone 410 or 430, thereby allowing accurate decoding of the DTMF tones 410 and 430. Similarly, tone 470 is sufficiently small that the decoding logic of the receiver can distinguish it as not being a DTMF tone 410 or 430. Like tones 340 and 350 of FIG. 3, tones 440, 450, and 460 are too far removed in frequency from DTMF tones 410 and 430 to be likely to cause any interference.

The problem of valid tone pair rejection resulting from interfering tones generated during mixing of DTMF tones, and the solution of generating a supplemental tone to attenuate these interfering tones can also be illustrated by way of mathematical approximation. For example, the signal that is received at a receiver decoder can be approximated by a polynomial having the form:

$$y(t) = c_0 + c_1 x(t) + c_2 x^2(t) + \ldots$$

where x(t) represents the signal generated by the acoustic dialer and has the form:

$$x(t) = \sin(2\pi pt) + \sin(2\pi qt)$$

In these equations, t represents time, the coefficients ($c_0$, $c_1$, $c_2$, ...) represent the physical variance in different telephone systems, p represents the frequency of the column DTMF tone, and q represents the frequency of the row DTMF tone.

Within the equation of y(t), the components $c_0$ and $c_1 x(t)$ do not act to cause interference to the DTMF tones, since $c_1 x(t)$ represents a bias on the acoustic dialer signal and $c_1 x(t)$ represents a linear gain or attenuation upon that signal. The powers of x(t), however, do act to introduce interfering tones. More particularly, interfering tones are not introduced by the powers of $\sin(2\pi pt)$ and the powers of $\sin(2\pi qt)$, since these powers produce harmonics that have been provided for in the selection of the DTMF tone frequencies, but are introduced by the cross-product term $\sin(2\pi pt)*\sin(2\pi qt)$. Applying the product theorem of trigonometric functions to this cross-product term, the sum and difference tones produced by these cross-product terms can be seen as:

$$\sin(2\pi pt)*\sin(2\pi qt)=\tfrac{1}{2}\{\cos(2\pi(p+q)t)+\cos(2\pi(p-q)t)\}$$

where $\cos(2\pi(p+q)t)$ and $\cos(2\pi(p-q)t)$ represent the sum and difference tones, respectively.

As explained above, the problematic interfering tones for keys 3 and 6 are the difference tones, which have the form $\cos(2\pi(p-q)t)$. Examples of supplemental tones which may be used to attenuate the interference caused by these difference tones have the forms $-A*\cos(2\pi(p-q)t)$ or $-A*\sin(2\pi(2p-q)t)$, where A is an empirically determined amplitude, and p, q, and t are defined as explained above. This first form of supplemental tone $(-A*\cos(2\pi(p-q)t))$ is useful for use with non-linear microphones (e.g.: carbon microphones), but adds interference when used with linear microphones (e.g.: capacitor microphones) because no corresponding interfering tone is present to balance out the canceling tone. The second form of supplemental tone $(-A*\sin(2\pi(2p-q)t))$, however, works effectively with both non-linear and linear microphones because it is far removed from the DTMF tones in frequency, whereby it will not cause interference when used with linear microphones, and yet still mixes with the DTMF tones to produce the necessary canceling tones when used with non-linear microphones.

A supplemental tone ideally should be generated so that its canceling tone is 180 degrees out of phase with the interfering tone sought to be attenuated. Replacing the variable t in the equation above with $(t-d/v_s)$, where d is the distance between loudspeaker and microphone and $v_s$ is the speed of sound, will cause the canceling tone to most effectively attenuate the interfering tone. The phase of the canceling tone need not be perfectly out of phase with the interfering tone, however, since any attenuating effect of the canceling tone may allow the receiver decoder to distinguish the interfering tone from DTMF tones.

Accordingly, an acoustic dialer signal (x(t)) taking into account the addition of the later form of the supplemental tone to the DTMF tones, as well as the phase of the input signal reaching the microphone surface, would appear as follows:

$$x(t)=\sin(2\pi p(t-d/v_s))+\sin(2\pi q(t-d/v_s))-A*\sin(2\pi(2p-q)(t-d/v_s)).$$

As mentioned above, selecting A can be accomplished through experimentation. Because the nonlinear characteristics of carbon microphones are somewhat dependent upon the microphone's orientation with respect to the earth, different values of A may be substituted into this equation to compensate for orientation. An orientation compensating mechanism could be fabricated, for example, which varies the value of A chosen based upon feedback from an orientation detecting sensor such as a mercury switch.

FIG. 5 illustrates a method for enabling and disabling supplemental-tone generation on a per-DTMF-tone-pair basis. As shown, at block 500, the acoustic dialer waits for a key depression or an equivalent (such as auto-dial) to be detected. Once a key depression is detected the acoustic dialer looks up the row and column frequencies for the DTMF tones corresponding to the particular key being depressed at block 510. At block 520, the acoustic dialer determines the sum and difference frequencies that are produced when the DTMF tones are mixed. These sum and difference frequencies are then compared to other DTMF tone frequencies to determine if they are near the center frequencies of the filters in the typical receiver at block 530. If the sum or difference tones are not likely to be filtered out by the filters, a corresponding supplemental tone is enabled at block 540. Otherwise, at block 550, supplemental-tone generation is disabled. Finally, at block 560, the DTMF tones and supplemental tone, if enabled, are generated simultaneously.

It will be understood that the foregoing is only illustrative of the principles of the invention and that various modifications can be made by those skilled in the art without departing from the scope and spirit of the invention. For example, the number of DTMF tones could be varied for a greater or fewer number of keys; different frequencies for the DTMF tones could be selected; the use of pairs of tones (DTMF tones) could be replaced with triplets, quadruplets, etc., of tones; any form (e.g.: $-A*\cos(2\pi(p-q)t)$ or $-A*\sin(2\pi(2p-q)t)$) of supplemental tone could be used to attenuate interfering tones, such as a square wave tone; supplemental tones could be generated for only those tones pairs that are problematic or all tone pairs; supplemental tones could be generated to attenuate sum tones, difference tones, or both; supplemental tones could be used to attenuate interference due to non-linearities caused by acoustic dialer loudspeakers, telephone microphones, amplifiers, filters, etc.; and the amplitude of the supplemental tone may or may not be varied based upon the orientation of the telephone microphone with respect to the earth.

The invention claimed is:

1. A method of attenuating an interfering tone produced when two or more key tones are mixed together, said key tones together indicating a telephone number element, each key tone having a respective key tone frequency, said method comprising the steps of:

selecting two or more key tones that produce an interfering tone frequency;

selecting a supplemental tone frequency to attenuate said interfering tone frequency included in said interfering tone; and simultaneously generating said selected supplemental and key tone frequencies.

2. The method of claim 1, wherein said interfering tone comprises a sum tone frequency of at least two key tones of said plurality of key tones.

3. The method of claim 1, wherein said interfering tone comprises a difference tone frequency of at least two key tones of said plurality of key tones.

4. The method of claim 1 further comprising the step of supplying the supplemental and key tone frequencies to a loudspeaker.

5. A method of generating Dual Tone Multi-Frequency (DTMF) tones to indicate a given telephone number element, said method comprising the steps of:

generating a column tone frequency indicating the telephone number element;

generating a row tone frequency indicating the telephone number element;

generating, simultaneously with said row and column tone frequencies, a supplemental tone frequency which attenuates a frequency in an interfering tone produced when said column and row tone frequencies are mixed.

6. The method of claim 5, wherein said supplemental tone attenuates a difference tone frequency included in said interfering tone.

7. The method of claim 5, wherein said supplemental tone attenuates a sum tone frequency included in said interfering tone.

8. The method of claim 5 further comprising the step of supplying the supplemental and key tone frequencies to a loudspeaker.

* * * * *